United States Patent Office 2,784,127
Patented Mar. 5, 1957

2,784,127

PLASTICIZED MONOMERIC ADHESIVE COMPOSITIONS AND ARTICLES PREPARED THEREFROM

Frederick B. Joyner and Harry W. Coover, Jr., Kingsport, Tenn., assignors to Eastman Kodak Company, Rochester, N. Y., a corporation of New Jersey No Drawing. Application June 2, 1954,
Serial No. 434,079

14 Claims. (Cl. 154—43)

This invention relates to monomeric α-cyanoacrylate adhesive compositions containing dissolved therein an ester plasticizer suitable for preventing failure of the adhesive bond after aging, and to composite articles prepared using such adhesive compositions.

The monomeric α-cyanoacrylate esters of the formula

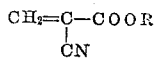

in which R represents an alkyl group of 1–8 carbon atoms, a cyclohexyl group, or a phenyl group, find widespread utility as adhesive compositions for bonding a great variety of similar and dissimilar materials, including both porous and nonporous materials. Such α-cyanoacrylate esters are used in the monomeric form and allowed to autopolymerize in situ in a thin film between surfaces to be adhered together. The adhesive composition can include a single monomeric α-cyanoacrylate ester or a mixture of such esters. The use of α-cyanoacrylate adhesives broadly is described in the copending application of Harry W. Coover, Jr. and Newton H. Shearer, Jr. Serial No. 318,325, filed November 1, 1952. As described in that application, the monomeric adhesive compositions stabilized with sulfur dioxide or a mixture of sulfur dioxide and another polymerization inhibitor such as hydroquinone can be stored in bulk for prolonged periods of time without polymerization and still polymerize rapidly without the use of a polymerization catalyst or the application of heat or pressure when spread in a thin film on the surface to be bonded. Such adhesive compositions are unique in their ability to bond a great variety of materials including glass, metals, plastics, wood, textiles, paper, and similar materials in a high strength bond. The adhesive bonds which are obtained usually possess a very high degree of bond strength over prolonged periods of time. In some cases, however, particularly after prolonged aging of bonded rigid elements, the bond can be fractured upon sudden shock. This occasional bond failure under shock is, of course, undesirable, since the adhesive bond is desirably subject to no failure in any case.

It is accordingly an object of this invention to provide improved α-cyanoacrylate adhesive compositions containing a plasticizing material which is effective to obviate objectionable bond failure after aging.

Another object of the invention is to provide monomeric α-cyanoacrylate adhesive compositions containing dissolved therein a minor amount of an ester plasticizer which does not diminish the adhesive properties of the composition, but which is sufficient to plasticize the polymerized adhesive bond to a sufficient degree to overcome the chance of failure of the adhesive bond under sudden shock.

Other objects will be apparent from the description and claims which follow.

These and other objects are attained by means of this invention wherein adhesive compositions comprising monomeric α-cyanoacrylate esters of the formula

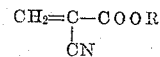

in which R is either an alkyl group of 1–8 carbon atoms, a cyclohexyl group, or a phenyl group, contain from 1–20% by weight, based on the weight of the monomeric ester, of at least one ester plasticizer of the type defined hereinafter. The monomeric α-cyanoacrylate which is used in practicing the invention can be prepared in any desired manner. Thus, for example, these monomeric esters can be prepared by reacting a suitable α-cyanoacetate with formaldehyde in aqueous or non-aqueous medium in the presence of a basic condensation catalyst to form a low molecular weight polymer which is thereafter depolymerized by heating under reduced pressure to give monomeric α-cyanoacrylate suitable for use in practicing the invention. The preparation of typical α-cyanoacrylate esters is described in the copending applications of Coover and Shearer, Serial No. 318,325, filed November 1, 1952, and of Joyner and Hawkins, Serial No. 415,422, filed March 10, 1954 now U. S. 2,721,858. Any of such α-cyanoacrylate monomers or mixtures thereof can be used in practiceing the invention.

In accordance with this invention, the monomeric adhesive composition contains dissolved therein from 1–20% by weight, and preferably from 1 to about 5% by weight, based on the weight of the cyanoacrylate ester, of one or more ester plasticizers of the following kinds. The ester plasticizer can be an alkyl ester of an aliphatic monocarboxylic acid of the formula

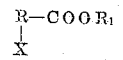

in which R is an alkyl group of 1–17 carbon atoms, $R_1$ is an alkyl group of 1–8 carbon atoms, and X is either —H, —CN, —Cl or —SO$_2$R. The plasticizer can also be an alkyl ester of an aliphatic dicarboxylic acid of the formula

in which $n$ is a whole integer in the range of 1–8 and $R_1$ is an alkyl group of 1–8 carbon atoms. Similarly, the alkyl phosphates in which each alkyl group contains 1–8 carbon atoms and the triaromatic phosphates such as triphenyl phosphate and tricresyl phosphate are suitably employed. The polyfunctional aliphatic esters such as the acyl triesters of glycerin in which each acyl group contains 2–18 carbon atoms are also suitably employed in practicing the invention. Other suitable plasticizers include the aliphatic and aromatic phosphonates, and particularly the dialkyl alkylphosphonates in which each alkyl group contains from 1–8 carbon atoms. Any of these esters can be used either alone or in combination in the compositions of this invention. We have found that such esters can be incorporated into the monomeric α-cyanoacrylates in amounts of as much as 20% by weight, based on the monomer weight, without affecting the adhesive action or strength of the adhesive bond to an objectionable degree. Amounts of plasticizer above 20% by weight seriously retard the rapid adhesive action and also lower the tensile strength of the bond. It was unexpected to find that sufficient plasticizer could be incorporated into the monomeric adhesive to effect the desired modification of the polymerized adhesive bond without adversely affecting the adhesive characteristics of the composition. When a rapid adhesive action is desired, it is generally preferred to limit the additive content to about 1–5% by weight. In the 5–20% range of plasticizer concentration, the adhesives are somewhat slower in their polymerization but are still quite useful. The adhesive bonds which are obtained have excellent tensile strength and possess high resistance to shock even after months of aging. The plasticizers serve the further purpose of flexibilizing the adhesive bond to some extent, which is a particular advantage in certain applications such as the bonding of films and similar flexible elements.

It will be understood that any of the ester plasticizers as defined herein can be used in practicing the invention. Typical esters which are suitable include the alkyl esters of cyanoacetic acid such as methyl cyanoacetate, ethyl cyanoacetate, butyl cyanoacetate, hexyl cyanoacetate, and the like; succinate esters such as dimethyl succinate, diethyl succinate, dioctyl succinate, dibutyl succinate, and similar succinate esters wherein the alkyl groups contain from 1-8 carbon atoms; sebacate esters wherein the alkyl groups contain from 1-8 carbon atoms, such as dimethyl sebacate, diethyl sebacate, dioctyl sebacate, and the like; adipic acid esters such as dimethyl adipate, diethyl adipate, dioctyl adipate, and the like; phthalate esters such as dioctyl phthalate, diethyl phthalate, and similar alkyl phthalates wherein the alkyl groups contain from 1-8 carbon atoms; acyl triesters of glycerin such as glyceryl triacetate, glyceryl tributyrate, glyceryl trilaurate, and similar acyl triesters in which the acyl group contains from 2-18 carbon atoms; alkyl esters of phosphoric acid providing such esters are free of acid and including such esters as triethyl phosphate or the like; aromatic phosphates such as triphenyl phosphate, tricresyl phosphate, and the like; phosphonates such as diethyl ethylphosphonate, and the like; and similar ester plasticizers as defined herein. Unexpectedly, these ester plasticizers could be used in amounts sufficient to flexibilize the polymerized adhesive bond without adversely affecting the desired degree of adhesion when employing the monomeric compositions.

The utility of the compositions embodying the invention is illustrated by the following examples.

Example 1

Two pieces of ordinary glass were bonded together by means of monomeric methyl α-cyanoacrylate in the usual fashion. The bonded article was allowed to age for 25 days, after which it was tapped until the bonded article broke. Upon examination of the break, it was found that 45% of the bonded area had been severed. In this case the adhesive composition which was employed contained no ester plasticizer and hence gave a relatively inflexible bond.

Example 2

A similar laminated glass article bonded with unplasticized monomeric methyl α-cyanoacrylate was allowed to age for four months. Upon severe tapping, a complete bond failure was observed. It is thus apparent that rigid articles such as laminated glass have a tendency to fracture in the adhesive bond when an unplasticized adhesive composition is employed and the laminated article is allowed to age for a prolonged period.

Example 3

Two pieces of ordinary glass were bonded together using an adhesive composition consisting of methyl α-cyanoacrylate monomer containing 1% by weight of butyl cyanoacetate based on the weight of the cyanoacrylate monomer. This bonded article was allowed to stand for 25 days and then was tapped sharply until breakage occurred. Examination of the break showed that only 1% of the bonded area had broken, and the remainder of the break was in the glass itself. It is thus apparent that by the use of as little as 1% of a suitable plasticizer as described herein, the tendency of rigid laminated articles to fail due to fracture of the adhesive bond is largely overcome.

Example 4

Laminated glass which had been bonded together by means of an adhesive composition of methyl α-cyanoacrylate monomer containing 1% by weight of butyl cyanoacetate was allowed to age for six months. At the end of this period, the bonded article was sharply tapped until breakage occurred. As in the previous example, the breakage occurred in the glass itself and no failure at the bond surface was observed. Thus the plasticized compositions of this invention largely obviate the possibility of bond failure due to ageing, and the action of the plasticizer in this respect is retained for prolonged periods of time.

Example 5

Similar results are observed with any of the ester plasticizers as defined herein. Thus, for example, two pieces of glass were bonded together by means of methyl α-cyanoacrylate monomer plasticized with 2% by weight of dimethyl succinate. After 25 days ageing, the bonded object was tapped until breakage occurred. In this case, bond failure was observed in only 8 to 10 percent of the bonded area as compared with a bond failure of 45% in Example 1.

Example 6

A glass to glass bond was formed by polymerizing in situ monomeric methyl α-cyanoacrylate plasticized with 5% by weight of dimethyl sebacate. After two months' ageing, no bond failure was observed when the laminated article was broken.

Example 7

The plasticizer can be used in amounts up to 20% by weight of plasticizer based on the weight of the monomeric cyanoacrylate. A glass to glass bond was formed from monomeric methyl α-cyanoacrylate containing 20% by weight of dioctyl adipate. This adhesive mixture was somewhat slower in setting up than was the unplasticized methyl cyanoacrylate, but after four months' ageing, the bond remained strong.

Example 8

As has been described, the compositions embodying this invention can be used for bonding a variety of materials. In a typical case, a metal to metal bond prepared by using monomeric ethyl α-cyanoacrylate plasticized by means of 5% by weight of butyl cyanoacetate showed no loss of tensile strength after three months' ageing.

Example 9

Two pieces of glass were bonded together in the usual fashion using monomeric methyl α-cyanoacrylate containing 3% by weight of methyl methylsulfonylacetate, $CH_3SO_2CH_2CO_2CH_3$. The resulting bond had a high degree of tensile strength and good ageing characteristics.

Example 10

Due to the flexibilizing action of the plasticizer on the adhesive bond, the compositions of this invention can be readily employed for bonding together flexible materials. Thus, for example, two pieces of polyterephthalate film were bonded together using methyl α-cyanoacrylate monomer plasticized by means of 2% by weight of dimethyl sebacate. The bond showed a high tensile strength and good flexibility after three months' ageing.

Example 11

Two pieces of polymeric film obtained by the condensation polymerization of pentamethylene glycol with p,p'-bis(carbomethoxyphenyl)sulfone were bonded together by means of ethyl α-cyanoacrylate plasticized with 3% by weight of tricresyl phosphate. The film showed good flexibility and continued strong bonding action after being aged for three months. Similar results are obtained with other α-cyanoacrylate adhesive compositions as defined herein containing these or similar cyanoacrylate monomers with any of the ester plasticizers as defined within the range of 1 to 20% by weight.

Thus by means of this invention the utility of the α-cyanoacrylate adhesive compositions is greatly increased. The possibility of bond failure upon ageing is minimized or obviated. The action of the plasticizer is effective to give flexible bonds which have added utility in the bonding of flexible articles wherein a rigid bond is undesirable. The compositions embodying this invention can be compounded with any of the materials which are ordinarily used in α-cyanoacrylate adhesive compositions. Thus, for example, the compositions usually contain at least 0.001% by weight based on the weight of the monomeric material of a suitable acidic polymerization inhibitor which prevents the polymerization of the adhesive composition in bulk during storage. The adhesive compositions of this invention desirably contain a gaseous polymerization inhibitor dissolved therein and preferably sulfur dioxide in an amount of about 0.001 to 0.003% by weight. In this range of concentrations, the polymerization inhibitor is effective during shelf storage in bulk but does not prevent autopolymerization of the adhesive composition when it is spread in a thin film on the surface to be bonded. Such inhibited compositions do not require the use of heat, pressure or polymerization catalyst during use. If larger amounts of polymerization inhibitor are used, the adhesive action can be speeded up by the use of heat or pressure or a basic polymerization catalyst if desired, and in the case of the higher esters of α-cyanoacrylic acid such polymerization adjuncts may be desirable in some cases. The adhesive compositions can contain any of the other compounding ingredients which are normally employed such as viscosity modifiers, coloring agents, fillers, pigments, and the like.

Although the lower alkyl esters of α-cyanoacrylic acid are desirably employed in practicing the invention, any of the other esters as defined herein can be used as well as combinations of two or more of such esters. Similarly, the plasticizer is usually a single material for convenience, but mixtures of two or more of the plasticizers can be used if desired.

The invention has been described in considerable detail with particular reference to certain preferred embodiments thereof, but it will be understood that variations and modifications can be effected within the spirit and scope of the invention as described hereinabove and as defined in the appended claims.

We claim:

1. A composite article comprising at least two elements adhered together by an in situ polymerized layer of an adhesive composition comprising monomeric α-cyanoacrylate ester of the formula $$CH_2=C-COOR$$
$$\phantom{CH_2=}|$$
$$\phantom{CH_2=}CN$$

wherein R is from the group consisting of alkyl groups of 1–8 carbon atoms, cyclohexyl groups and phenyl groups, and 1–20% by weight based on the weight of said α-cyanoacrylate ester of at least one ester plasticizer selected from the group consisting of alkyl esters of aliphatic monocarboxylic acids of the formula $$R-COOR_1$$
$$\phantom{R-}|$$
$$\phantom{R-}X$$

wherein R is an alkyl group of 1–17 carbon atoms, $R_1$ is an alkyl group of 1–8 carbon atoms, and X is a member of the group consisting of —H, —CN, —Cl and —$SO_2R$, alkyl esters of aliphatic dicarboxylic acids of the formula $$R_1OOC-(CH_2)_n-COOR_1$$

wherein $n$ is a whole integer of from 1 to 8, and $R_1$ is an alkyl group of 1–8 carbon atoms, trialkyl phosphates wherein each alkyl group contains 1–8 carbon atoms, triaromatic phosphates selected from the group consisting of triphenyl phosphate and tricresyl phosphate, acyl triesters of glycerine wherein each acyl group contains 2–18 carbon atoms, dialkyl alkyl phosphonates wherein each alkyl group contains 1–8 carbon atoms, and alkyl phthalates wherein each alkyl group contains 1–8 carbon atoms.

2. A composite article comprising at least two rigid elements adhered together by an in situ polymerized layer of an adhesive composition comprising monomeric alkyl α-cyanoacrylate wherein the alkyl group contains 1–8 carbon atoms, and 1–20% by weight based on the weight of said α-cyanoacrylate of plasticizer comprising an alkyl ester of an aliphatic monocarboxylic acid, said acid containing 1–18 carbon atoms and said alkyl group containing 1–8 carbon atoms.

3. A composite article comprising at least two rigid elements adhered together by an in situ polymerized layer of an adhesive composition comprising monomeric alkyl α-cyanoacrylate wherein the alkyl group contains 1–8 carbon atoms and 1–20% by weight, based on the weight of α-cyanoacrylate, of alkyl α-cyanoacetate wherein the alkyl group contains 1–8 carbon atoms.

4. A composite article comprising at least two rigid elements adhered together by an in situ polymerized layer of an adhesive composition comprising monomeric alkyl α-cyanoacrylate wherein the alkyl group contains 1–8 carbon atoms and 1–20% by weight, based on the weight of α-cyanoacrylate, of alkyl diester of a polymethylene dicarboxylic acid, said dicarboxylic acid containing 1–8 carbon atoms and each of said alkyl groups containing 1–8 carbon atoms.

5. A composite article comprising at least two rigid elements adhered together by an in situ polymerized layer of an adhesive composition comprising monomeric alkyl α-cyanoacrylate wherein the alkyl group contains 1–8 carbon atoms, and 1–20% by weight based on the weight of said α-cyanoacrylate of tricresyl phosphate.

6. A composite article comprising at least two rigid elements adhered together by an in situ polymerized layer of an adhesive composition comprising monomeric alkyl α-cyanoacrylate wherein the alkyl group contains 1–8 carbon atoms, and 1–20% by weight, based on the weight of said α-cyanoacrylate, of acyl triester of glycerine wherein each acyl group contains 2–18 carbon atoms.

7. A composite article comprising glass elements bonded together by an adhesive layer formed by polymerizing in situ an adhesive composition comprising methyl α-cyanoacrylate containing 1–20% by weight, based on the weight of said α-cyanoacrylate, of at least one ester plasticizer from the group consisting of alkyl esters of aliphatic monocarboxylic acids of the formula $$R-COOR_1$$
$$\phantom{R-}|$$
$$\phantom{R-}X$$

wherein R is an alkyl group of 1–17 carbon atoms, $R_1$ is an alkyl group of 1–8 carbon atoms, and X is a member of the group consisting of —H, —CN, —Cl and —$SO_2R$, alkyl esters of aliphatic dicarboxylic acids of the formula $$R_1OOC-(CH_2)_n-COOR$$

wherein $n$ is a whole integer of from 1 to 8, and $R_1$ is an alkyl group of 1–8 carbon atoms, trialkyl phosphates wherein each alkyl group contains 1–8 carbon atoms, triaromatic phosphates selected from the group consisting of triphenyl phosphate and tricresyl phosphate, acyl triesters of glycerine wherein each acyl group contains 2–18 carbon atoms, and dialkyl alkyl phosphonates wherein each alkyl group contains 1–8 carbon atoms.

8. A composite article comprising at least two rigid elements adhered together by an in situ polymerized layer of an adhesive composition comprising monomeric alkyl α-cyanoacrylate wherein the alkyl group contains 1–8 carbon atoms, and 1–20% by weight based on the weight of said α-cyanoacrylate of butyl cyanoacetate.

9. A composite article comprising at least two rigid elements adhered together by an in situ polymerized layer of an adhesive composition comprising monomeric alkyl α-cyanoacrylate wherein the alkyl group contains 1-8 carbon atoms, and 1-20% by weight based on the weight of said α-cyanoacrylate of dimethyl succinate.

10. A composite article comprising at least two rigid elements adhered together by an in situ polymerized layer of an adhesive composition comprising monomeric alkyl α-cyanoacrylate wherein the alkyl group contains 1-8 carbon atoms, and 1-20% by weight based on the weight of said α-cyanoacrylate of dimethyl sebacate.

11. A composite article comprising at least two rigid elements adhered together by an in situ polymerized layer of an adhesive composition comprising monomeric methyl α-cyanoacrylate containing 1-5% by weight based on the weight of said α-cyanoacrylate of butyl cyanoacetate.

12. A composite article comprising at least two rigid elements adhered together by an in situ polymerized layer of an adhesive composition comprising monomeric methyl α-cyanoacrylate containing 1-5% by weight based on the weight of said α-cyanoacrylate of tricresyl phosphate.

13. A composite article comprising at least two rigid elements adhered together by an in situ polymerized layer of an adhesive composition comprising monomeric methyl α-cyanoacrylate containing 1-5% by weight based on the weight of said α-cyanoacrylate of dimethyl succinate.

14. A composite article comprising at least two rigid elements adhered together by an in situ polymerized layer of an adhesive composition comprising monomeric methyl α-cyanoacrylate containing 1-5% by weight based on the weight of said α-cyanoacrylate of dimethyl sebacate.

References Cited in the file of this patent

UNITED STATES PATENTS

| | | |
|---|---|---|
| 2,244,389 | D'Alelio | June 3, 1941 |
| 2,306,533 | Frederickson | Dec. 29, 1942 |
| 2,346,858 | Mighton | Apr. 18, 1944 |
| 2,467,927 | Ardis | Apr. 19, 1949 |
| 2,492,170 | Mast et al. | Dec. 27, 1949 |
| 2,535,827 | Ardis et al. | Dec. 26, 1950 |
| 2,721,858 | Joyner et al. | Oct. 25, 1955 |

FOREIGN PATENTS

| | | |
|---|---|---|
| 648,626 | Great Britain | Apr. 7, 1948 |

OTHER REFERENCES

"Synthetic Resins," 1944, page 72.